J. R. STOVALL.
COMBINED COTTON CHOPPER AND CULTIVATOR.
APPLICATION FILED MAY 13, 1910.
977,340.
Patented Nov. 29, 1910.
4 SHEETS—SHEET 2.
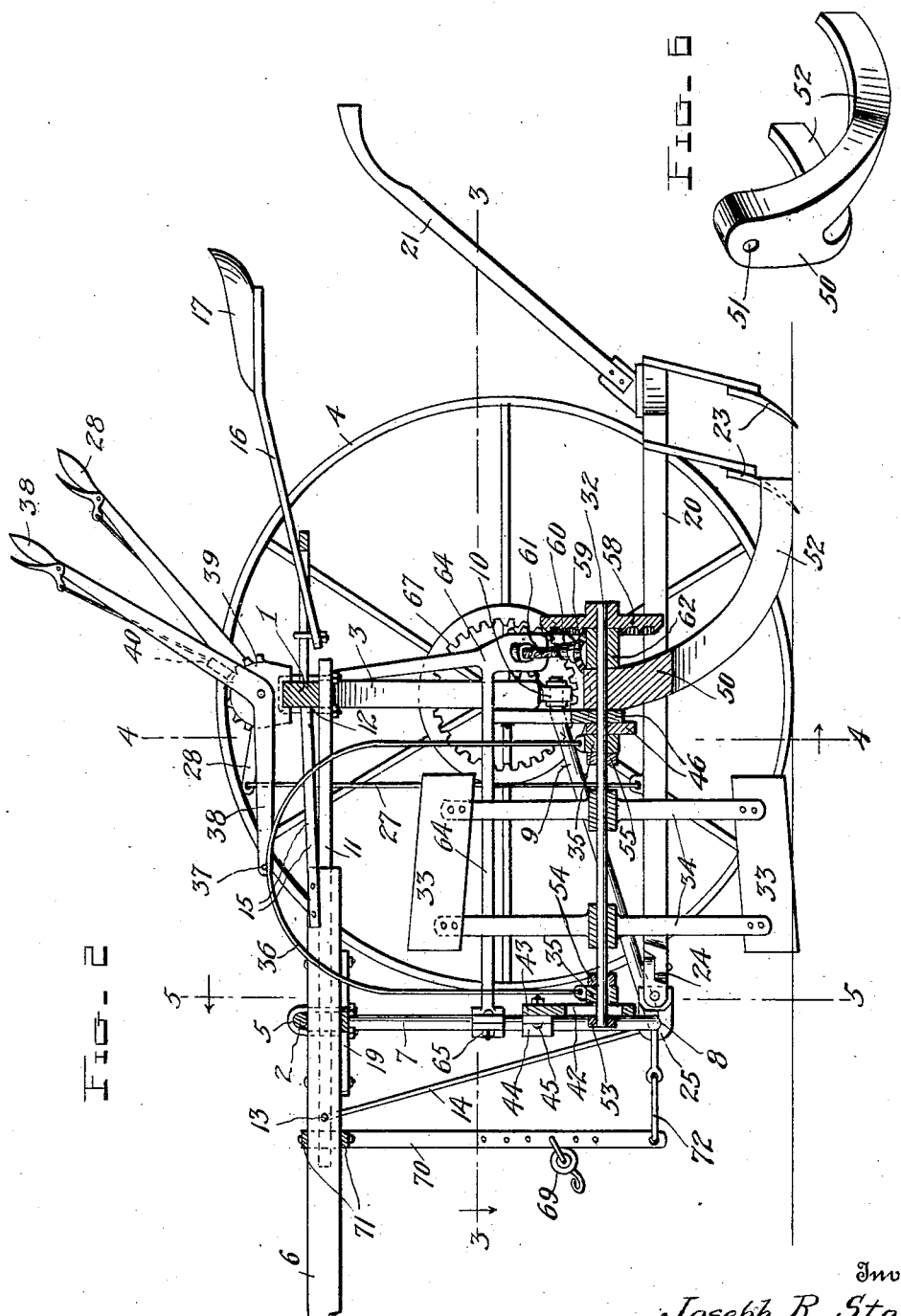
Witnesses
Chas. L. Griesbauer.
Ed. C. Ardeser.
Inventor
Joseph R. Stovall
By Andrew Griesbauer, Jr.
Attorney

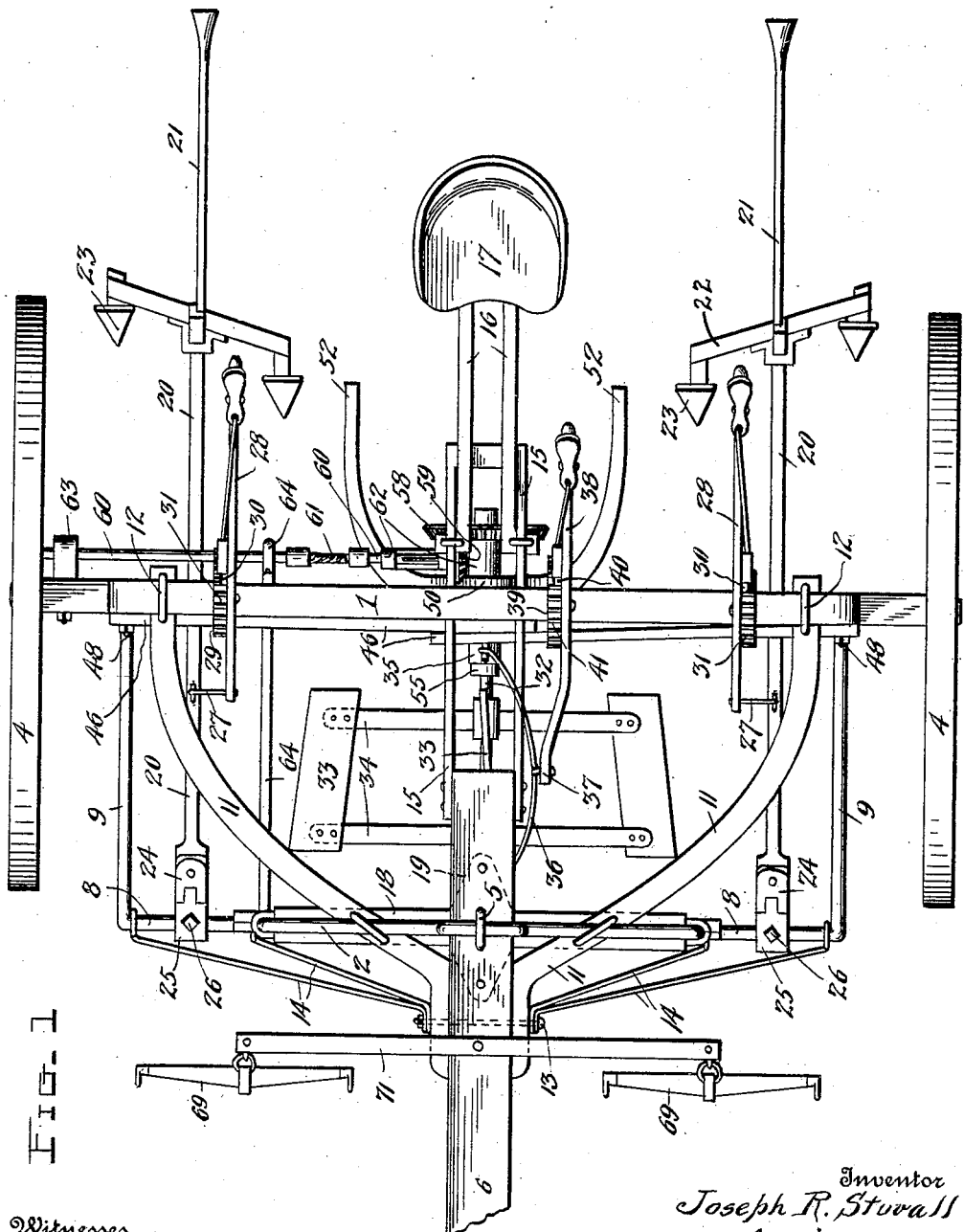

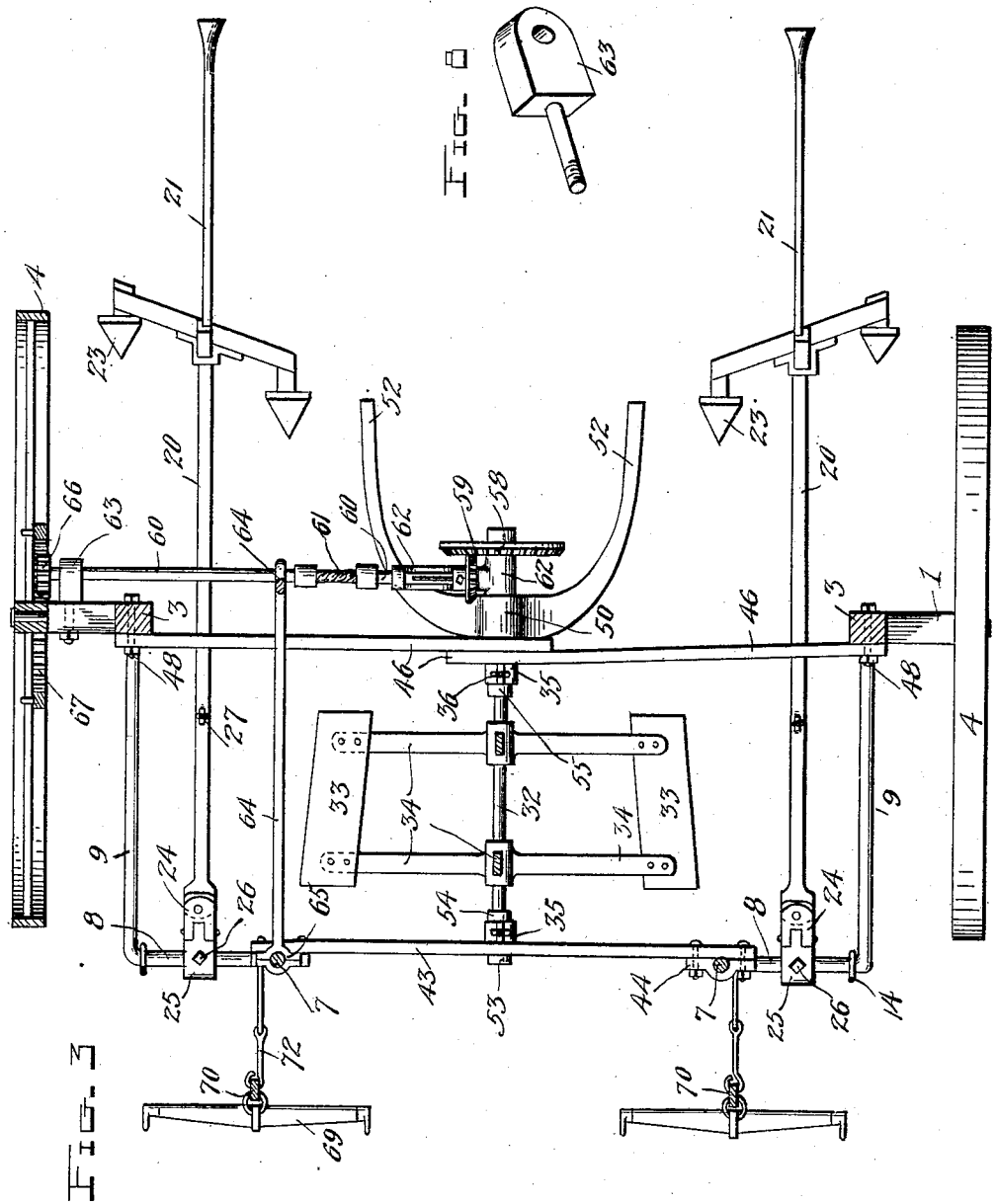

J. R. STOVALL.
COMBINED COTTON CHOPPER AND CULTIVATOR.
APPLICATION FILED MAY 13, 1910.
977,340.
Patented Nov. 29, 1910.
4 SHEETS—SHEET 4.
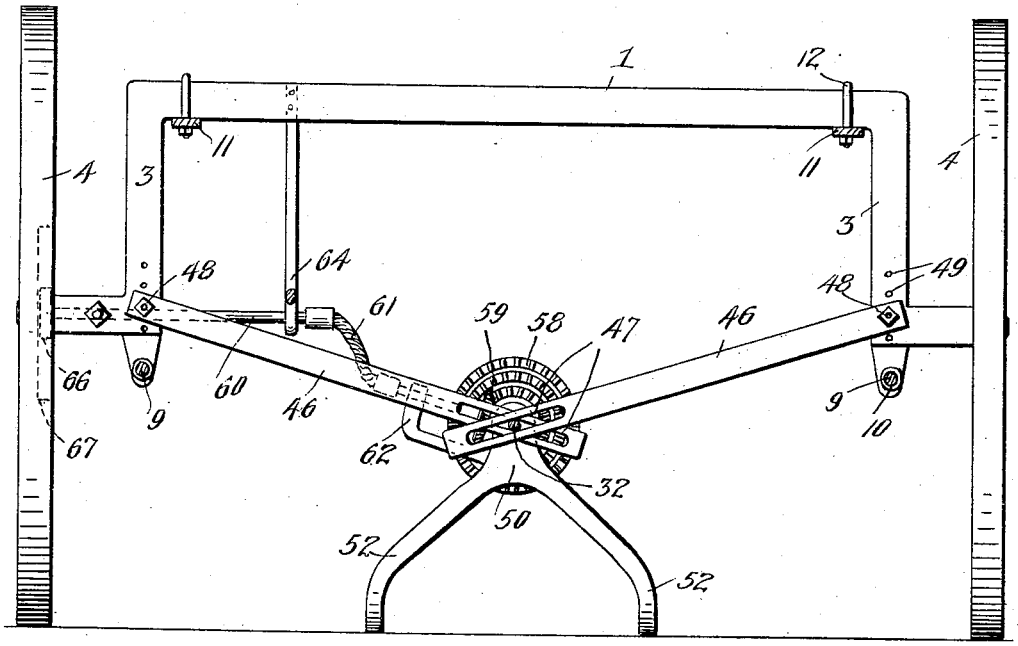
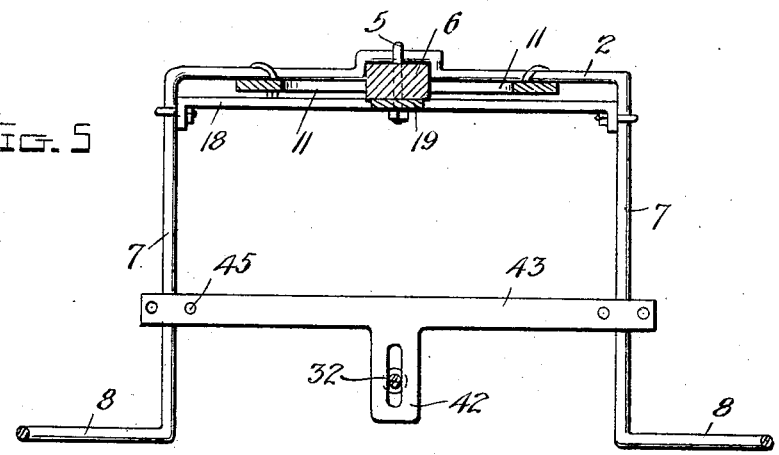
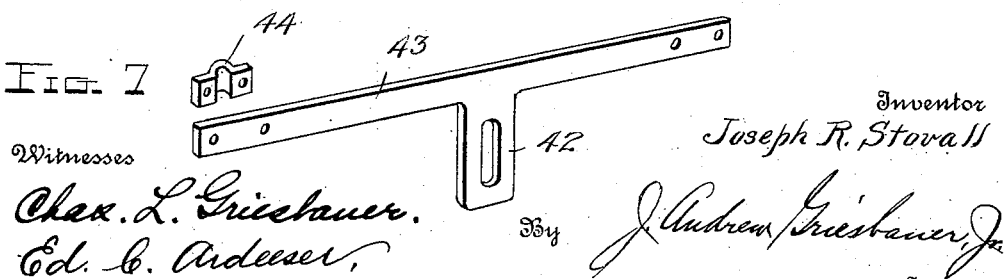
Witnesses
Chas. L. Griesbauer.
Ed. C. Ardeeser.
Inventor
Joseph R. Stovall
By J. Andrew Griesbauer, Jr.
Attorney

UNITED STATES PATENT OFFICE.

JOSEPH R. STOVALL, OF ATWOOD, OKLAHOMA, ASSIGNOR OF ONE-HALF TO CHARLES B. IRWIN, OF ATWOOD, OKLAHOMA.

COMBINED COTTON CHOPPER AND CULTIVATOR.

977,340.

Specification of Letters Patent. Patented Nov. 29, 1910.

Application filed May 13, 1910. Serial No. 561,216.

*To all whom it may concern:*

Be it known that I, JOSEPH R. STOVALL, a citizen of the United States, residing at Atwood, in the county of Hughes and State of Oklahoma, have invented certain new and useful Improvements in a Combined Cotton Chopper and Cultivator, of which the following is a specification.

This invention relates to improvements in combined cotton choppers and cultivators.

The object of the invention is to provide a simple and practical machine of this character which will simultaneously chop a row of cotton plants and cultivate the same, thereby effecting a great saving in time and labor, and in which the chopping parts may be removed after the cotton has been chopped, so that the machine may be used for cultivating purposes solely.

With the above and other objects in view the invention consists in the novel features of construction and the combination and arrangement of the parts, hereinafter described and claimed, and illustrated in the accompanying drawings, in which:

Figure 1 is a top plan view of the improved combined cotton chopper and cultivator; Fig. 2 is a vertical front to rear sectional view; Fig. 3 is a horizontal sectional view taken on line 3—3 in Fig. 2; Figs. 4 and 5 are detail sectional views taken respectively on lines 4—4 and 5—5 in Fig. 2; Fig. 6 is a perspective view of the slide member; Fig. 7 is a similar view of the slotted guide member for the front end of the chopper shaft; and Fig. 8 is a detail view of one of the bearings.

The main frame of the improved machine or implement comprises an arched axle 1 and a front arch member or bar 2. The axle has on its depending ends 3 spindles for two ground wheels 4 which support the frame and one of which drives the chopper. The front arch 2 has its central portion secured by a clip bolt 5 to a draft tongue 6, and the depending or vertical portions 7 of the arch 2 are bent outwardly to provide pivots 8 and then rearwardly to form lower side bars 9 which latter have their rear ends secured at 10 to the lower extremities of the vertical portions 3 of the arched axle. The frame also comprises upper side bars 11 which are curved longitudinally and have their rear ends secured by clips 12 to the horizontal part of the arched axle and their front ends secured on opposite sides of the tongue 6 by a transverse bolt 13. The latter also serves to unite to the tongue inclined braces 14 which extend upwardly from the ends of the pivots 8. The tongue has secured to its rear end horizontal bracing and supporting bars 15 which extend rearwardly through the axle 1 and support resilient bars 16 carrying a seat 17. To further strengthen and brace the frame, a cross bar 18 is secured at its ends to the vertical portions 7 of the arch 2 and at its center is a plate 19 which is secured to the bottom face of the tongue.

20, 20 denote two cultivator beams provided at their rear ends with upwardly and rearwardly extending handles 21 and with horizontal cross bars from which depend standards carrying cultivator shovels 23. The front ends of the beams 20 are connected by universal joints 24 to sleeves 25 arranged on the pivots 8. These sleeves are adapted to be adjusted longitudinally on pivots 8 by means of set screws 26, whereby the cultivator beams 20 may be positioned closer to or farther from each other. For the purpose of adjusting the cultivator beams vertically and lifting them when the machine is turned around, their intermediate portions are connected by links 27 to bell-crank hand levers 28 mounted on brackets 29 on top of the arched axle 1. These hand levers carry the usual spring-projected, hand retracted dogs 30 to engage segmental racks 31 on the brackets 29.

The cotton chopping mechanism comprises a horizontal shaft 32 mounted for vertical adjustment and carrying a chopping wheel composed of angularly arranged blades 33 secured to the arms of two heads 34 having their hubs fixed to the shaft 32, see Fig. 2. The shaft 32 is rotatably mounted in two bearing blocks 35 which are connected to the depending ends of an inverted U-shaped, resilient member or hanger 36 having its center pivoted at 37 to the front end of a bell-crank hand lever 38. This lever 38 is fulcrumed at its angle on a bracket 39 on the arched axle 1 and its rear or handle end carries a spring-projected, hand-retracted dog 40 to engage a segmental locking rack 41 on the bracket 39. By means of the lever 38 the chopping wheel may be adjusted vertically and also raised out of contact with the ground.

The front end of the shaft 32 is guided in a slotted arm 42 depending from the center of and formed integral with a guide member 43 in the form of a cross bar arranged between the vertical portions 7 of the front arch. The bar 43 is detachably and adjustably mounted by having its ends cross the parts 7 and by bolting clamping plates 44 to said ends as shown at 45 said clamping plates 44 being shaped to engage the parts 7 as will be seen on reference to Figs. 2 and 3.

The rear portion of the shaft 32 is guided by a pair of downwardly and inwardly inclined bars 46 which have their crossed portions formed with longitudinal slots 47 through which said shaft extends. The upper and outer ends of these inclined or diagonal bars 46 are detachably and adjustably pivoted by means of pivot bolts 48 which may be placed in any of the openings of vertical series of openings 49 formed in the depending portions 3 of the arched axle.

50 denotes a slide or runner mounted on the rear portion of the chopper shaft 32 and adapted to travel on the surface of the ground to limit the depth of the cuts made by the revolving blades of the chopping wheel and also to guard or protect the plants from the ground thrown over by the cultivator shovels. This runner is of inverted U-shape and has its top formed with a central cylindrical opening 51 to receive the shaft 32 whereby it is adapted to have lateral swinging movement. The depending ends or arms of the runner are spaced apart and curved rearwardly so that they will readily slide over the ground and also serve as plant guards or shields.

Stop collars 53, 54, and 55 are fixed to the shaft 32 as shown in Fig. 2 for the purpose of preventing longitudinal shifting movement of the shaft and the parts thereon.

The shaft 32 is driven from one of the wheels 4 and at different speeds by fixing to the rear end of said shaft a gear 58 having a plurality of concentric rows of teeth with any one of which may be meshed a pinion 59 slidably mounted and adjustably secured on a transverse shaft 60. The latter is preferably composed of two sections united by universal joints or a flexible shaft 61. The inner section of this shaft 60 is rotatably mounted in a T-shaped bearing 62 the cross portion of which is in the form of a sleeve loosely arranged on shaft 32. The third branch of the bearing 62 is curved or off-set to extend around the pinion 59. The outer section of the shaft 60 is rotatable in a bearing block 63 removably secured to one end portion 3 of the axle and also in a right angular bearing member 64 having a vertical branch bolted to the axle 4 and a horizontal branch which extends forwardly and is clamped as at 65 to one of the parts 7. On the extreme outer end of the shaft 60 is fixed a gear 66 which meshes with an internal gear 67 fixed to the adjacent wheel 4.

The draft animals are connected to swingletrees 69 vertically adjustable on upright draft bars 70 which hang from the ends of a two-piece cross bar 71 on the tongue 6 and the lower ends of which are connected by links 72 to the pivots 8.

The operation of the machine is as follows: When it is desired to chop cotton and simultaneously cultivate it, the parts are arranged as shown in the drawings, so that as the machine is pulled through a field by the draft animals, the motion of one of the wheels 4 will be imparted to the chopping wheel. When the machine is thus used, the driver preferably walks behind it with his hands on the handles 21 of the cultivator beams so that he may guide them. After the cotton has been chopped the machine may be used as a riding cultivator by removing the parts 62, 46, 43 and 38.

From the foregoing it will be seen that the invention provides a simple and practical machine the use of which will effect a great saving of time and labor in chopping cotton and which may be used not only as a chopper but also as a cultivator.

What I claim is:

1. In a machine of the character described, the combination of a frame including an arched axle, a front arch and means connecting said parts, ground wheels on the axle, a cross bar uniting the vertical portions of the front arch and having a vertically slotted central portion, a pair of diagonal bars pivoted to the vertical ends of the axle and having crossed inner ends formed with longitudinal slots, a forwardly and rearwardly extending shaft having its front end guided in the slotted portion of said cross bar and its rear end guided in the slotted portions of said diagonal bars, a chopping wheel on said shaft, bearings on said shaft, an adjustable lever on the axle, a resilient U-shaped hanger between said lever and said bearings, and means for driving said shaft from one of the ground wheels.

2. In a machine of the character described, the combination of a frame including an arched axle, a front arch and means connecting said parts, ground wheels mounted on the axle, a cross bar uniting the vertical portions of the front arch and having a vertically slotted central portion, a pair of diagonal bars pivoted to the vertical ends of the axle and having crossed inner ends formed with longitudinal slots, a forwardly and rearwardly extending shaft having its front end guided in the slotted portion of said cross bar and its rear end guided in the slotted portions of said diagonal bars, a chopping wheel on said shaft, bearings on said shaft, an adjustable lever on the axle, a resilient U-shaped hanger between said lever and said bearings, a gear fixed to the rear end of said shaft, a gear fixed to one of the ground wheels, a transverse shaft having inner and outer sections flexibly connected, a bearing for the inner section of the transverse shaft arranged on said forwardly and rearwardly extending shaft, bearings on the frame for the outer section of the transverse shaft, and gears on the two sections of the transverse shaft to mesh with the first mentioned gears.

In testimony whereof I affix my signature in presence of two witnesses.

JOSEPH R. STOVALL.

Witnesses:
J. E. CAMPBELL,
N. J. JOHNSON.